Jan. 18, 1966 H. TANTER ET AL 3,230,460

ELECTRONIC SWITCHING SYSTEM

Filed Aug. 31, 1959

1

3,230,460
ELECTRONIC SWITCHING SYSTEM
Hervé Tanter, Villebon Sur Yvette, Seine-et-Oise, and Gérard Marie Edouard van den Broek, Versailles, Seine-et-Oise, France, assignors, by mesne assignments, to International Standard Electric Corporation, New York, N.Y., a corporation of Delaware
Filed Aug. 31, 1959, Ser. No. 837,282
2 Claims. (Cl. 328—101)

In the applications of the same inventors, Serial No. 837,284 and Serial No. 837, 283, both filed August 31, 1959, is described a radar system for detecting moving targets involving an arrangement for sampling the information received and feeding said sampled information to a pass-band filter, the upper cut-off frequency of which is small with respect to the higher frequencies of the frequency spectrum of the signals applied to the input of the sampling circuit. In such systems the sampling circuit comprises an electronic switch controlled by pulses, the characteristic of which being determined according to the sampling method used.

Difficulties are often encountered when designing such electronic switches that must provide a high attenuation ratio between the two conditions, on and off, and operate within broad limits of frequencies, for example around several megacycles per second.

One object of the present invention is to provide an electronic switch having a high ratio of attenuation between the on and off conditions.

The invention will be particularly described in relation with reference to the accompanying drawings in which.

Figures 1, 2:
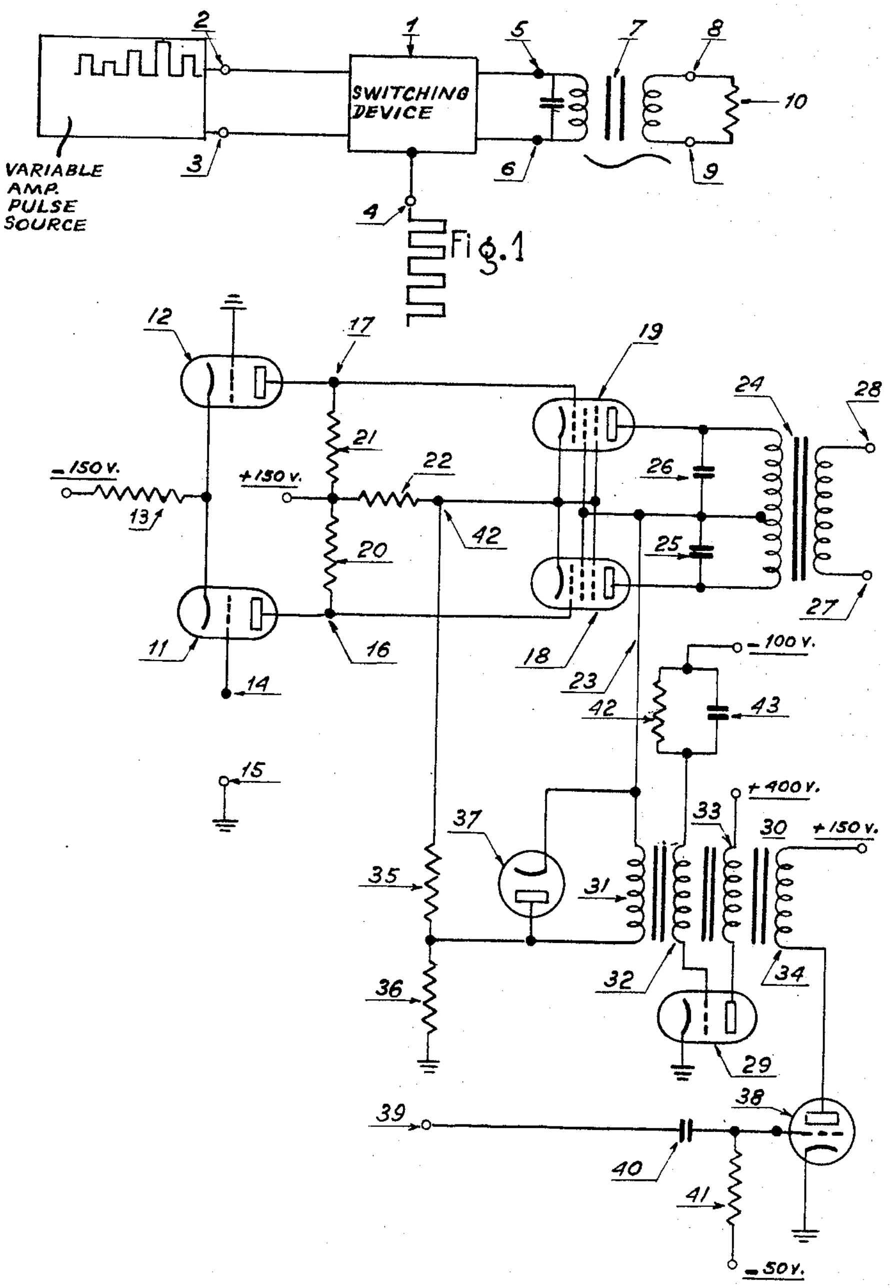
FIGURE 1 shows an embodiment of the present invention.
FIGURE 2 shows, in detail, a pulse selector circuit involving characteristics of the invention.

In the radar systems described in the above-mentioned applications means are provided for applying at the input of the switching means pulses, the position of which, with respect to the pulses radiated, characterizes the distance between the transmitter and the target from which these echo-pulses are received. These pulses are modulated by a sinusoidal waveform, the frequency of which is low with respect to the higher frequency of the spectrum of the pulses or are unmodulated, according to whether the target is moving or stationary with respect to the transmitter antenna. The electronic switching devices are provided for separating the pulses corresponding to targets located at a distance with respect to the transmitter antenna determined by the time position of the control signal, applied to the switching device, with respect to the transmitted pulse. The pulses so extracted are fed to a pass band filter adapted for separating the modulating signal corresponding to the echoes received after reflection on moving targets. As it is mentioned above, the frequency of the modulating signal is low with respect to the higher frequency of the pulse spectrum. Moreover the output impedance of the switching device must be matched to the input impedance of the filter. According to the invention, the impedance matching is obtained by means of a transformer, the bandwidth of which is at least equal to the bandwidth of the filter.

In FIGURE 1 is shown a switching arrangement according to the invention. The switching device 1 can be of any type, provided it fulfills the requirements with respect to the switching frequency and the ratio of attenuation between the two conditions of the switch, said requirements being imposed by the system in which the switching device operates. At the input terminals 2 and 3 are applied rectangular pulses, the frequency of which is around several kilocycles per second which may be

2 amplitude modulated by a sinusoidal waveform the frequency of which is comprised between $f1$ and $f0$ (for example $f1=100$ c./s. and $f0=2000$ c./s.). It is assumed that the electronic switch 1 is in off condition, in the absence of control signal and that it is switched to the on condition when pulses of suitable amplitude and polarity are applied to the control terminal 4. The output terminals 5 and 6 of the electronic switch 1 are connected to the terminal of the primary winding of the transformer 7. The terminals 8 and 9 of the secondary winding of the transformer 7 are connected to the load that has been shown as a resistance 10 of suitable value. The transformer 7 is designed to present a bandwidth comprised between $f1$ and $f0$, for example at ±1 decibel. If the repetition frequency of the pulses applied to the output transformer during the control pulse applied to the electronic switch 1 is $fr$, the frequency spectrum of the signals comprises the components $nfr$ for the signals corresponding to stationary targets and $nfr \pm fm$ for the signals corresponding to the moving targets, $fm$ corresponding to the frequency of the amplitude modulation of said signals. It is assumed as in the embodiment shown in the first above-mentioned applications, that $fr=4$ kc./s. and 100 c./s.$<fm<$2000 c./s. This being so, the component $nfr \pm fm$ of the frequency spectrum, which is within the frequency band $f1-f0$ is the only one to pass through the system without attenuation and, as it has been explained, the information conveyed by this component allows the separation of the echoes received after reflection on moving target from the echoes received after reflection on stationary targets and this by using an output transformer easy to design.

A particular embodiment of the arrangement shown schematically in FIGURE 1 will be described in connection with FIG. 2. Two triodes 11 and 12 are shown with a common cathode resistor 13 a phase inverter circuit. The signals are applied to the input terminals 14 and 15 and the signals at the points 16 and 17 of the anode load resistances 20 and 21 are 180° out of phase. They are respectively applied to the control grids of vacuum tube amplifier 18 and 19, which in the embodiment shown are pentode tubes. The cathodes of tubes 18 and 19 are connected in parallel to point 42 of a potentiometer comprising resistances 22, 35, 36 across which a positive potential is applied. The suppressor grids are connected to point 42. The screen grids are both connected to the high tension conductor 23. The anodes of tubes 18 and 19, respectively, are connected to the ends of the primary winding of a transformer 24, the center tap of which is connected to the conductor 23. Condensers 25 and 26 are connected in parallel, respectively across the two parts of the primary winding of transformer 24 to provide the desired bandwidth characteristics. The output signals of transformer 24 appearing at the output terminals 27 and 28 are at a substantially constant level within the bandwidth of the transformer.

This electronic switch is controlled by applying to the anodes and to the screens of tubes 18 and 19, through the conductor 23 and the primary winding of the transformer 24, a positive gating pulse produced by a blocking oscillator comprising the triode 29 and the transformer 30 provided with four windings 31, 32, 33, 34.

The two windings 32 and 33 are connected as usual in conventional blocking oscillators. The winding 31 is the output winding at the terminal of which appears the high tension pulse that is applied to the anodes of tubes 18 and 19 through the resistances 35 and 36 and the conductor 23. The drop occurring in resistance 36 makes point 42 more negative at the same time positive voltage is applied to the anodes. The diode 37, connected in parallel with the winding 31, is used for cancelling the negative pulses that appear, as it is well known, across the winding 31 at the end of the positive pulse produced by the blocking oscillator. The network comprising in parallel the resistance 42 and the condenser 43, connected to the grid of tube 29, determines the duration of the output pulse of the blocking oscillator.

The winding 34 of the transformer, connected to the anode of the triode 38 is used for controlling the operation of the blocking oscillator.

When a positive pulse is applied to the control terminal 39 of the arrangement shown in FIGURE 2, that pulse is fed to the grid of the triode 38 by the condenser 40 and the resistance 41. The pulse appearing in the winding 34 of the transformer 30 triggers the blocking oscillator so that a positive pulse is applied to the anodes of tubes 18 and 19 through the winding 31 of transformer 30.

During this pulse, pentodes 18 and 19 are driven to conduction and the frequency components of signals applied to the terminals 14 and 15 comprised within the bandwidth of the transformer 24 appear at the output terminals 27 and 28 of the circuit.

The arrangement of FIGURE 1 has been shown by way of example, but it must be understood that other means, well known in the art, could be used for producing the positive control pulse applied to the anodes of pentodes 18 and 19, instead of a blocking oscillator.

While the principles of the above invention have been described in connection with specific embodiments and particular modifications thereof it is to be clearly understood that this description is made by way of example and not as a limitation of the scope of the invention.

What we claimed is:

1. An electronic switching arrangement for sampling information appearing as pulses having a relatively high repetition rate and containing information represented by a low frequency amplitude modulation over a given frequency band comprising a pair of tubes each having at least a cathode, an anode and a control grid, a transformer having its primary winding connected between said anodes, means for tuning said transformer to provide a band-pass characteristic for said given frequency band, and a high impedance at said repetition rate, means for applying said information pulses to said grids in 180° phase relation, means normally applying potentials between said cathodes and anodes to block said tubes to the passage of said information pulses to said transformer, means for producing gating pulses, at said relatively high repetition rate, and means for applying said gating pulses to said anodes and cathodes to overcome said applied potentials and unblock said tubes.

2. A switching device according to claim 1, wherein said gating pulse producing means comprises a blocking oscillator producing pulses of a given duration, and means responsive to control pulses to operate said blocking oscillator.

References Cited by the Examiner

UNITED STATES PATENTS

| | | | |
|---|---|---|---|
| 2,324,314 | 7/1943 | Michel | 328—101 |
| 2,483,766 | 10/1949 | Hansell | 332—43 |
| 2,576,137 | 11/1951 | Newitt | 328—101 |
| 2,578,256 | 12/1951 | MacNichol | 328—94 |
| 2,837,644 | 6/1958 | Shallon | 328—101 |
| 2,850,700 | 9/1958 | Morris | 332—43 |

ARTHUR GAUSS, *Primary Examiner.*

FREDRICK M. STRADER, *Examiner.*